United States Patent [19]

Jost et al.

[11] Patent Number: 4,500,434

[45] Date of Patent: Feb. 19, 1985

[54] INHIBITING SCALE PRECIPITATION FROM HIGH TEMPERATURE BRINE

[75] Inventors: John W. Jost, Santa Ana; Darrell L. Gallup, Ontario, both of Calif.

[73] Assignee: Union Oil Company of California, Los Angeles, Calif.

[21] Appl. No.: 446,489

[22] Filed: Dec. 2, 1982

[51] Int. Cl.³ .............................................. C02F 5/08
[52] U.S. Cl. .................................. 210/696; 60/641.5; 210/698; 422/12
[58] Field of Search ........................... 60/641.2, 641.5; 210/696–698; 422/12

[56] References Cited

U.S. PATENT DOCUMENTS

| | | | |
|---|---|---|---|
| 4,224,151 | 9/1980 | Jost | 210/696 |
| 4,319,895 | 3/1982 | Kemmer | 60/641.5 |
| 4,405,463 | 9/1983 | Jost et al. | 60/641.2 |

OTHER PUBLICATIONS

Field Evaluation of Scale Control Methods: Acidification by J. Z. Grens and L. B. Owen of Lawrence Livermore Laboratory, Geothermal Resources Council, Transactions, vol. 1, May 1977.

Using Salton Sea Geothermal Brines for Electrical Power: A Review of Progress in Chemistry and Materials Technology—1976 Status by George E. Tardiff, May 31,1977, Lawrence Livermore Laboratory.

Determination of the Rate of Formation of Solids from Hypersaline Geothermal Brine as a Function of pH by J. E. Harrar, C. H. Otto, Jr., J. H. Hill, C. J. Morris, R. Lim, and S. B. Deutscher—Sep. 28, 1977, Lawrence Livermore Laboratory.

*Primary Examiner*—Peter Hruskoci
*Attorney, Agent, or Firm*—Dean Sandford; Gregory F. Wirzbicki; Robert A. Franks

[57] ABSTRACT

A method for inhibiting the precipitation of a scale, such as an iron silicate scale, from a hot aqueous brine solution, such as a geothermal brine, during production and handling of the brine wherein there is injected into the brine a brine-soluble acid in an amount sufficient to lower the pH of the brine from 0.1 to 0.3 pH units.

13 Claims, 1 Drawing Figure

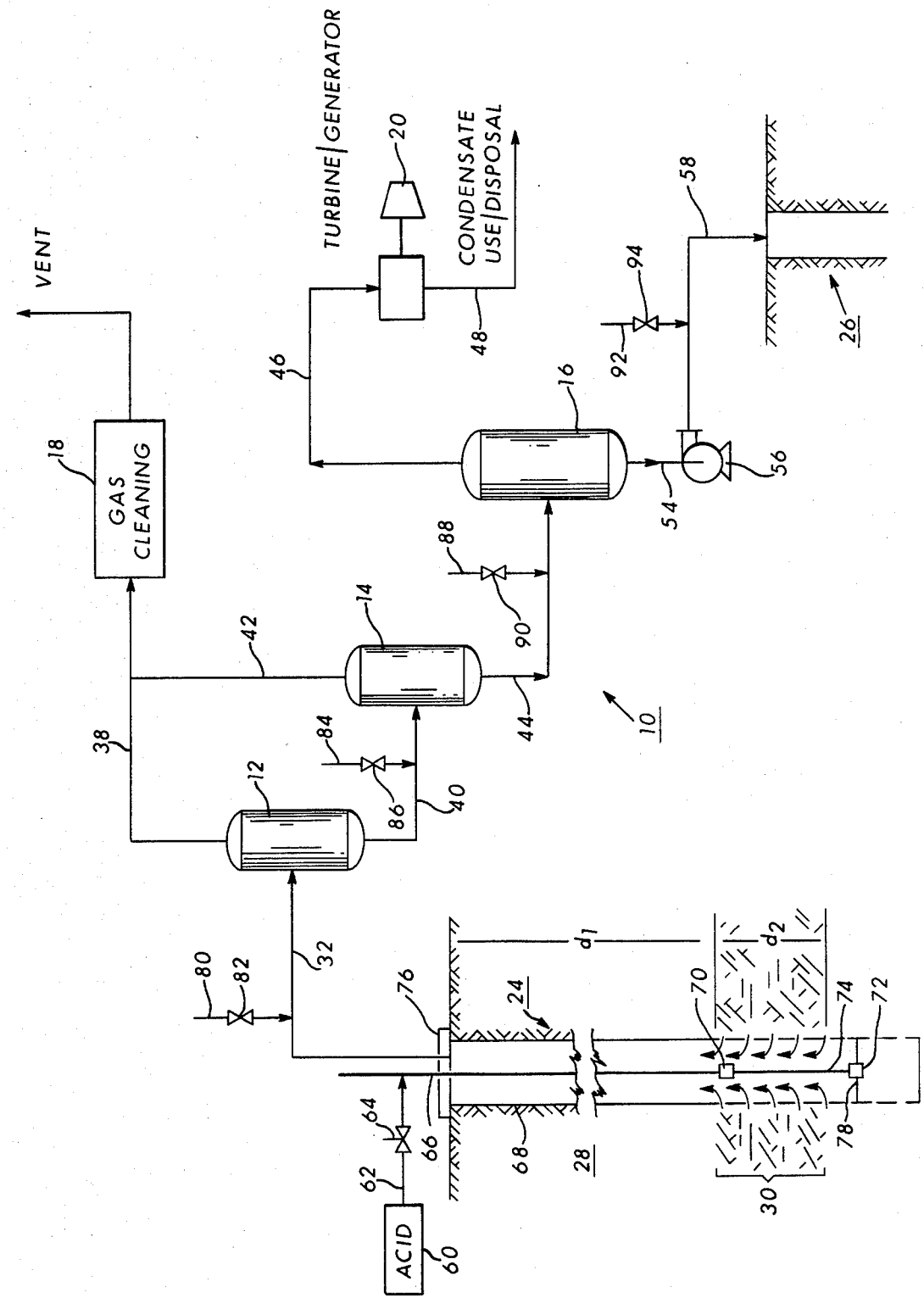

INHIBITING SCALE PRECIPITATION FROM HIGH TEMPERATURE BRINE

BACKGROUND OF THE INVENTION

1. Field of the Invention

This invention relates to the treatment of a hot aqueous brine solution containing various dissolved components, such as iron and silica to inhibit precipitation of scale, such as iron silicate scale, therefrom. More particularly, the invention relates to such a treatment wherein the scale is formed when the brine is produced and handled in a manner so that its temperature and pressure are reduced, e.g., a geothermal brine utilized for its heat content.

2. Description of the Prior Art

The solubility of most ions in solution decreases with a decrease in temperature of the solution. If dissolved ions are present near their saturation concentration in the solution, a slight reduction in the temperature of the systems can result in precipitation of a portion of these ions which often combine and deposit as a scale on any solid surface with which they come in contact, such as the vessel or conduit in which the solution is confined.

One example of such a solution is a hot water-containing fluid stream which is passed through a conduit in an industrial operation under conditions, such as lowering of the pressure, at which at least a portion of the hot water flashes to steam. If the hot water is a brine containing appreciable amounts of dissolved salts, this flashing is often accompanied by the formation of scale on the surfaces of the conduit contacted by the fluid stream. This deposition of scale tends to build up over a period of time and restrict further fluid flow through the conduit. This necessitates either operation at a reduced flow rate or an increase in the amount of power used to move the fluid through the conduit. In extreme cases the conduit can become completely plugged with scale, and the industrial operation must be shut down for maintenance. An example of such an industrial operation involves the generation of steam which can be used as a source of heat or to generate power. Various methods of generating steam utilize fossil-fuel steam generators, nuclear steam supply systems and geothermal generator units.

Large subterranean reservoirs of naturally occurring geothermal steam and/or hot aqueous liquid are found in many regions of the world. When readily accessible in advantageous locations, geothermal steam and water or brine have, for some time, been used for therapeutic purposes, industrial processes and/or direct heating. Although current interest in further developing geothermal resources for such purposes still exists, the principal effort has recently been directed more towards developing these resources, which are usually considered to be at least partially renewable, for production of electric power, the use of which is usually far less site-restricted than is the more direct use of the geothermal fluids for non-electric power purposes.

Techniques are known whereby hot geothermal fluids can be used to generate electric power. Geothermal steam can be used to drive combination steam turbine/electric generator apparatus. Pressurized geothermal water or brine, having a temperature above about 400° F., can be flashed to a lower pressure to extract steam used for driving steam turbine/generators. In actual practice the problems encountered with handling and disposing of the large amounts of usually heavily contaminated and frequently highly saline geothermal liquids have often been quite formidable. Consequently, development of geothermal water/brine resources for production of commercial amounts of electricity has often been difficult and costly to achieve.

The most serious problems encountered with the use of hot aqueous liquids, such as geothermal brine, for producing electric power or in other uses usually result from severe scaling of the handling equipment, such as the confining vessels and conduits, used to contain the liquid. Because of their typically high temperatures and their long natural residence times in subterranean reservoirs, geothermal brines ordinarily leach large amounts of minerals from the reservoirs. These leached minerals typically include salts and oxides of heavy metals such as lead, zinc, iron, silver, cadmium and molybdenum. Other minerals such as calcium and sodium, generally in the form of chlorides, are also dissolved in the brine, as are naturally occurring gases, including carbon dioxide, hydrogen sulfide and methane. Large concentrations of silica, which may be in the form of silicic acid oligomers, are also commonly found dissolved in hot geothermal brines.

Various proposals have been made to decrease the scale formation in equipment used in producing and handling geothermal brine. In "Field Evaluation of Scale Control Methods: Acidification", by J. Z. Grens et al., Lawrence Livermore Laboratory, Geothermal Resources Council, Transactions, Vol. 1, May 1977, there is described an investigation of the scaling of turbine components wherein a geothermal brine having a pressure of 220 to 320 p.s.i.g. and a temperature of 200° to 230° C. (392° to 446° F.) was expanded through nozzles and impinged against static wearblades to a pressure of 1 atmosphere and a temperature of 102° C. (215° F.) In the nozzles the primary scale was heavy metal sulfides, such as lead sulfide, copper-iron sulfide, zinc sulfide and cuprous sulfide. The adherence of the primary scale of the metal substrate was promoted by thin basal layers of fine-grained, iron-rich amorphous silica. The scale formed on the wearblades was cuprous sulfide, native silver and lead sulfide in an iron-rich amorphous silica matrix. When the brine which originally had a pH of 5.4 to 5.8 was acidified with sufficient hydrochloric acid to reduce the pH of the expanded brine to values between 1.5 to 5.0, scaling was eliminated.

While the aforementioned treatments have met with some success in particular applications, the need exists for a further improved treating process to reduce scale deposition during the handling of hot aqueous brines, especially geothermal brines.

Accordingly, it is a principal object of this invention to provide a method for inhibiting the deposition of scale onto fluid handling equipment contacted by a hot water-containing fluid stream and the removal of such scale from such surfaces.

It is a further object of this invention to provide such a method for inhibiting the deposition of iron silicate scale from a geothermal brine.

It is a still further object of this invention to provide such a method wherein corrosion of the fluid handling equipment is minimized.

It is another object of this invention to treat a geothermal fluid, containing at least a portion of a geothermal brine, utilized for the generation of electric power so as to inhibit the deposition of iron silicate scale from the geothermal brine onto the fluid handling equipment.

Other objects, advantages and features of the invention will be apparent from the following description, drawing and appended claims.

SUMMARY OF THE INVENTION

Briefly, the invention provides a method for treating a pressurized liquid hot water-containing fluid stream passing through industrial equipment including one or more vessels and/or conduits, which water or brine contains dissolved salts including iron ions and silica species, in which in at least one vessel or conduit the pressure is reduced so that at least a portion of the liquid water flashes to steam. There is added to the fluid stream, in an amount sufficient to lower the pH of the water 0.1 to 0.3 pH unit, an acid soluble in the water to inhibit the formation on the vessel and/or conduit of scale, such as an iron silicate scale, from the dissolved salts and/or dissolve any such scale previously formed therein.

BRIEF DESCRIPTION OF THE DRAWING

The present invention will be more readily understood by reference to the drawing which depicts in simplified form relevant portions of an exemplary geothermal brine production well and power plant with which the pH modification method of the present invention may be used to advantage.

DETAILED DESCRIPTION OF THE INVENTION

In producing and utilizing hot pressurized aqueous brine solutions, which solutions contain dissolved metal salts at or near their saturation concentration, in a manner so that the pressure and/or temperature is reduced, a portion of the metal salts can precipitate and deposit as scale on the surfaces of the vessel or conduit confining the brine. Examples of such hot pressurized aqueous brine solutions include geothermal brines and other brines used in a wide variety of industrial operations. A number of different types of scale can form depending on the nature and concentration of the metal salts in solution. Many of these scales are soluble in an acid solution. However, due to the high temperature of the brine, e.g., 250° to 500° F. and the fact that the confining vessels and conduits are generally of a ferrous metal, the addition of acid into the system results in severe corrosion of the metals. While corrosion inhibitors are known for most acids, these inhibitors do not function well under the severe temperature conditions of many systems. Thus, the use of acid to dissolve such scale has been limited and most often confined to systems employing corrosion resistant but expensive metals rather than the ferrous metals found in most industrial equipment.

It has now been found that scale formation from brine can be reduced and scale previously formed can be removed by including in the brine an acid in an amount substantially less than that previously suggested, e.g., only enough acid is added to the brine to lower the pH 0.1 to 0.3 unit. While some corrosion of the ferrous metal components occurs upon the addition of even these small amounts of acid, the industrial operation can be carried out for an appreciable length of time without scale problems before the ferrous metal components are corroded to the point that they must be replaced or repaired.

Shown in simplified form in the drawing are relevant portions of an exemplary geothermal brine power plant 10. Comprising generally power plant 10 are first wellhead separator 12, second wellhead separator 14 and flash vessel 16. Shown included in power plant 10 are gas cleaning means 18 and steam turbine/generator 20. Associated with power plant 10, but not actually forming a part thereof, are brine extraction well 24 and brine reinjection well 26. Extraction well 24 penetrates into earth 28 a depth "$d_1$" to brine producing formation 30 which has a thickness "$d_2$". Ordinarily, reinjection well 26 is similar to extraction well 24 and may penetrate to the same producing formation 30.

In operation, hot geothermal brine is introduced under pressure from extraction well 24 through conduit 32 into the side region of first separator 12. Within separator 12, non-condensable gases including hydrogen sulfide, carbon dioxide and ammonia are stripped from the geothermal brine. These non-condensable gases are discharged from the top of separator 12 through gas conduit 38 into gas cleaning means 18. The brine is discharged from the bottom of separator 12 and is directed through conduit 40 into the side region of second separator 14, in which remaining amounts of non-condensable gases are stripped from the brine. These remaining gases are discharged from the top of separator 14 through gas conduit 42 into conduit 38, to be directed thereby into gas cleaning means 18. Included in gas cleaning means 18 may be heat exchangers (not shown) which enable heat to be extracted from the hot non-condensable gases to create additional steam from steam condensate in a manner known to those skilled in the art.

From separator 14, the brine is discharged through conduit 44 into flashing vessel 16. Within flashing vessel 16, the brine is flashed to a substantially lower pressure, such as 125 pounds per square inch gauge (p.s.i.g.), so as to release steam, the released steam being routed from vessel 16 through conduit 46 to steam turbine/generator 20. Condensate and/or steam is discharged from turbine/generator 20 through conduit 48 for disposal or for routing to heat exchanger portions of gas cleaning means 18. Flashed brine is discharged from flashing vessel 16 through conduit 54 to pump 56 which pumps the brine through conduit 58 into reinjection well 26. Alternatively, pump 56 may pump the brine to other means of disposal or to other uses (not shown).

Effective pH of the brine as it enters well 24 from producing formation 30 is believed typically to be between about 4 and 4.5; however, due to removal of the non-condensable gases, the pH of the brine typically increases to between about 5 and 6 by the time it enters flashing vessel 16. Ordinarily as the brine enters well 24 from formation 30 flashing occurs to an extent causing release of about 1 to 1.5 percent of the steam contained in the brine, and by the time the brine reaches the top of well 24, additional flashing usually has occurred to an extent that between about 10 and 20 percent of the steam has been released. Brine temperature at producing formation 30 varies considerably from well to well, but is usually in the broad range of from about 350° to 600° F., with brine temperature of between about 450° and 500° F. being typical of many localities.

According to the present invention an acid is introduced from source 60, through conduit 62 containing valve 64 into conduit 66 which extends down well 24, inside of well casing 68, terminating in nozzle 70 positioned approximately opposite brine producing formation 30. In a preferred embodiment, the downhole apparatus employed in the method of this invention includes anchor 72 attached to nozzle 70 by connecting rod or conduit 74. Anchor 72 helps maintain the position of nozzle 70 in well 24 during the injection of the acid down conduit 66. As conduit 66 can be a small diameter coiled tubing extending several thousand feet down well 24 from wellhead 76, in the absence of anchor 72 nozzle 70 may tend to move about undesirably in well 24. Anchor 72 helps maintain nozzle 70 adjacent brine producing formation 30, the location where it is desired to inject the acid into the flow of geothermal brine. Anchor 72 may be positioned anywhere in the vicinity of nozzle 70. Since brine producing formation 30 is sometimes incompetent, it is preferred to position anchor 72 in well 24 below producing formation 30 as shown in the drawing. Anchor 72 can be of any conventional design, for example, an anchor having three or more locking arms 78 which fold up independently as collars while anchor 72 is being lowered downhole. When the desired depth is reached, conduit 66 is retracted a short distance to set locking arms 78 against the formation. Later, when it is desired to remove nozzle 70 from the well, a stronger upward pull on conduit 66 shears a pin (not shown) in anchor 72 allowing locking arms 78 to collapse and the apparatus to be pulled from well 24. Since the acid exits conduit 66 via nozzle 70, connecting rod or conduit 74 does not transport any fluid. All that is required is that nozzle 70 be firmly attached to anchor 72. This connection is often made using a conduit simply because conduit material is readily available and easy to use, even though it is used for its mechanical strength rather than as a conduit.

Since the portion of conduit 66 extending below wellhead 74 is exposed to the high temperature environment of the geothermal fluid being produced, it is preferred that conduit 66 and nozzle 70 be made of a corrosion resistant metal, e.g., stainless steel, Hastelloy, Inconel, or the like.

While the acid can be injected from source 60 downhole at producing formation 30 so as to lower the pH of the brine as close as practical to its origin, brine pH usually increases further as it passes through power plant 10, for example, as non-condensable gases are removed at separators 12 and 14 and the brine is flashed in vessel 16. Thus, it is often desirable to inject the acid into the brine flow in places where significant pH increases otherwise occur. By so doing, a more uniform brine modification may be achieved or the amount of brine acidizing may be varied according to the amount required at various locations.

To this end, acid may, for example, in addition to or rather than being injected downhole, be injected into brine conduit 32 between wellhead 76 and first separator 12 via conduit 80 containing valve 82; into brine conduit 40 between first and second separators 12 and 14 via conduit 84 containing valve 86; into brine conduit 44 between second separator 14 and flash vessel 16 via conduit 88 containing valve 90; and/or into conduit 58 just upstream of injection well 26 via conduit 92 containing valve 94. Conduits 80, 84, 88 and 92 each are connected to acid source 60 (connections not shown).

While the acid treatment of this invention is effective in controlling a wide variety of scale, of particular importance are iron silicate scales. Typically such scales are formed by the reaction of hydrated ferric oxyhydroxide with silica acid or silicic acid oligomers as follows:

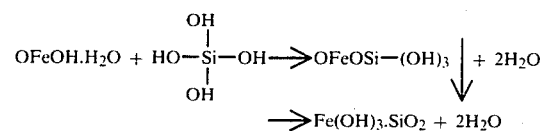

Further acidizing the already acidic geothermal brine is believed to shift equilibrium conditions away from the formation of a precipitate and/or to interfere with the precipitation reaction involved. The hydrogen ions ($H^+$) added by the further acidization are believed to tie up the ferric oxyhydroxide and thereby inhibit the indicated reaction of ferric oxyhydroxide with silicic acid which forms insoluble iron rich silicates. However, regardless of the specific nature of the reaction involved, it has nevertheless been demonstrated that the method of this invention is effective in reducing the scales deposited from geothermal brine.

The brine-soluble acids suitable for use in this invention are inorganic mineral acids, organic carboxylic acids, mixtures thereof, and combinations of inorganic and organic acids. Mineral acids which may be used are hydrochloric, sulfuric, nitric and perchloric acid. Operable organic carboxylic acids are those that form water-soluble or acid-soluble salts of alkali metal and alkaline earth metals. Aromatic and aliphatic monocarboxylic, dicarboxylic and tricarboxylic acids having 1 to about 6 carbon atoms can be used. The carboxylic acids can be saturated or unsaturated and substituted or unsubstituted. When a substituted carboxylic acid is used, the most common substituent is the chloride ion. For example, benzoic, formic, acetic, chloroacetic, peracetic, trichloroacetic, citric, oxalic and maleic acids can be used. The most preferred brine-soluble acid is hydrochloric acid. Generally, about 50 to 180 weight parts per million of a water-soluble acid is employed. While any of the acids may be used in concentrated form, it is common to employ aqueous solutions of such acids. For example, an aqueous solution containing about 5 to 31 percent by weight hydrochloric acid is ofen employed.

The present invention is further described by the following examples which are illustrative of various aspects of the invention but which are not intended as limiting the scope of the invention as defined by the appended claims.

EXAMPLES 1 to 7

A series of field tests are made to determine the effect of the addition of hydrochloric acid to a high enthalpy, silica-rich, heavy metal laden, hypersaline brine of an extremely reactive nature. There is produced from a production well a geothermal fluid comprising a mixture of steam and brine. The geothermal fluid is passed through a first separator where the steam and brine are separated. The steam, which would normally be used to drive a turbine, is vented to the atmosphere at this test facility. Various amounts of acid are then injected into the flowing stream of brine just downstream of the first separator. The acidified brine is next passed through a second separator where the pressure is reduced to flash additional quantities of steam which is also vented to the atmosphere. The acidified brine is then repressurized and reinjected back into the subterranean geothermal reservoir via an offset injection well. During the test measurements are made of the pH of the brine before and after the addition of the acid, the extent of scale build up in the unit, and the extent of corrosion of the various fluid handling equipment.

More particularly, a geothermal fluid comprised of about 90 percent by weight brine and about 10 percent by weight steam is produced from a production well at a temperature of 455° F. and a pressure of 400 p.s.i.g. The brine contains about 251,000 weight parts per million solids made up of the following weight parts per million of various elements: less than 0.3 aluminum, 1.7 silver, 12.8 arsenic, 319 boron, 1,070 barium, 103 bromine, 1.2 cadmium, 25,000 calcium, 149,000 chlorine, 0.06 chromium, 12 cesium, 5.2 copper, 0.4 fluorine, 459 iron, 5 iodine, 13,500 potassium, 1,770 lithium, 49 magnesium, 793 manganese, 58,000 sodium, less than 0.1 nickel, 81 lead, 73 rubidium, less than 1 selenium, 200 silicon, 400 strontium, and 302 zinc.

The geothermal fluid is passed at a rate of about 250,000 pounds/hour through an 8 inch diameter carbon steel pipe to and through two 48 inch diameter, 26 feet long horizontally positioned separators operated in series. The first separator is operated at 400 psig. The separated steam, which would normally be used to drive a turbine, is vented to the atmosphere at this test facility. Just downstream of the first separator is positioned a 10 inch diameter, 41 inch long acid mixing spool containing a three element vane-type motionless mixer. A 31 percent by weight aqueous solution of hydrochloric acid is pumped at various rates from a storage facility into the acid mixing spool via an injection nozzle which is a Hastelloy pipe extending into the acid mixing spool near the brine inlet end thereof.

The acidified brine is next fed to the second horizontally positioned separator which is operated at 200 psig. The additional separated steam is again vented to the atmosphere. The acidified brine is next fed to a charging pump where the pressure of the brine is increased to about 250 psig. The partially-repressurized acidified brine is then fed to an injection pump which pumps the brine at a high flow rate and at about 750 psig pressure approximately 5,000 feet to an offset injection well and back into the geothermal reservoir. Carbon steel corrosion coupons are positioned in the flowing brine at four locations, i.e., just before the acid injection point, just after the acid injection point, immediately downstream of the injection pump discharge and near the injection wellhead.

The pH of the brine is measured above and below the acid mixing spool.

Scale buildup on piping and vessels is measured by online radiographic techniques employing an Iridium-192 source. The source and film plate are positioned on opposite sides of the point of interest. The differences in gamma absorption of the brine, scale and steel results in sufficient contrast to produce a radiograph from which projected thickness of scale can be measured.

The results of these tests are shown in the Table. These results show that in the absence of the addition of an acid, scale rapidly builds up in the test apparatus. Upon the addition of enough hydrochloric acid to decrease the pH of the flowing brine stream up to about 0.3 pH unit, the build up of scale is substantially decreased without an appreciable increase in corrosion of the equipment handling the brine. When the amount of hydrochloric acid added is increased to lower the pH of the flowing brine stream from 0.43 to 0.80 pH unit, the amount of scale formed again substantially decreases. However, with the addition of this larger amount of hydrochloric acid, the corrosion in the system increases sharply. Thus, a relatively large amount of hydrochloric acid, i.e., enough to lower the pH of the brine stream more than about 0.3 pH units, while effective in reducing scale formation, would not be a satisfactory brine treating agent because the corrosion is too great. Only treatment with enough hydrochloric acid to reduce the pH of the brine stream about 0.3 pH unit or less reduces scale deposition without excessively corroding the system.

TABLE

EFFECT OF ADDITION OF HYDROCHLORIC ACID TO HOT FLOWING GEOTHERMAL BRINE

| Example Number | Length of Test (days) | Amount Hydrochloric acid added (weight parts per million) | pH Upstream of Mixing Spool | pH Downstream of Mixing Spool | pH Reduction Across Spool | Scale Formed | Corrosion |
|---|---|---|---|---|---|---|---|
| 1 | 8 | none | 5.97 | 5.97 | 0.00 | heavy | moderate |
| 2 | 5 | 147 | 5.97 | 5.80 | 0.17 | moderate | moderate |
| 3 | 8 | 189 | 5.95 | 5.67 | 0.28 | moderate | moderate |
| 4 | 3 | 214 | 5.98 | 5.68 | 0.30 | moderate | moderate |
| 5 | 13 | 253 | 5.88 | 5.45 | 0.43 | moderate | severe |
| 6 | 5 | 358 | 5.92 | 5.24 | 0.68 | moderate | severe |
| 7 | 2 | 400 | 6.30 | 5.47 | 0.83 | light to moderate | severe |

Although particular embodiments of the invention have been described, it will, of course, be understood that the invention is not limited thereto, since many obvious modifications can be made, and it is intended to include within this invention any such modification as may fall within the scope of the claims.

We claim:

1. A method for inhibiting the precipitation of iron silicate scale from a pressurized aqueous brine solution having a pH of about 5 to about 6, which solution contains dissolved scale-forming salts, during passage of the said fluid stream through industrial equipment wherein the pressure is reduced so that at least a portion of the solution flashes to steam and dissolving such scale previously formed comprising adding to the solution an amount of water-soluble acid sufficient to lower the pH of the solution by between about 0.1 and 0.3 pH unit.

2. The method defined in claim 1 wherein the aqueous brine solution is a geothermal brine.

3. The method defined in claim 1 wherein the aqueous brine solution is a geothermal fluid comprising a mixture of brine and steam.

4. The method defined in claim 1 wherein the water-soluble acid is added to the aqueous brine solution before the pressure of the aqueous brine solution is substantially reduced.

5. The method defined in claim 1 wherein the water-soluble acid is selected from the group consisting of inorganic material acids, organic carboxylic acids, and mixtures thereof.

6. The method defined in claim 5 wherein the water soluble acid is hydrochloric acid.

7. The method defined in claim 1 wherein about 50 to 180 weight parts per million water-soluble acid is employed.

8. A method for inhibiting the precipitation of iron silicate scale from a hot pressurized geothermal fluid, having a pH about 5 to about 6 and containing dissolved salts including iron ions and silica species, during passage of the geothermal fluid through industrial equipment wherein the pressure is reduced so that at least a portion of the geothermal fluid flashes to steam and dissolving such scale previously formed, comprising adding to the geothermal fluid an amount of a water-soluble acid sufficient to lower the pH of the geothermal fluid by between about 0.1 to 0.3 pH unit.

9. The method defined in claim 8 wherein the geothermal fluid comprises a mixture of brine and steam.

10. The method defined in claim 8 wherein the water-soluble acid is added to the geothermal fluid before the pressure of the geothermal fluid is substantially reduced.

11. The method defined in claim 8 wherein the water-soluble acid is selected from the group consisting of inorganic mineral acids, organic carboxylic acids, and mixtures thereof.

12. The method defined in claim 11 wherein the water-soluble acid is hydrochloric acid.

13. The method defined in claim 8 wherein about 50 to 180 weight parts per million water-soluble acid is employed.

* * * * *

UNITED STATES PATENT OFFICE
CERTIFICATE OF CORRECTION

Patent No. 4,500,434                    Dated February 19, 1985

Inventor(s) John W. Jost and Darrell L. Gallup

It is certified that error appears in the above-identified patent and that said Letters Patent are hereby corrected as shown below:

In column 8, line 67, "material" should read -- mineral --.

Signed and Sealed this

Twenty-sixth Day of November 1985

[SEAL]

Attest:

DONALD J. QUIGG

Attesting Officer         Commissioner of Patents and Trademarks